United States Patent [19]

Ferrante

[11] 4,384,759
[45] May 24, 1983

[54] HOLOGRAPHIC CORRECTOR ELEMENT

[75] Inventor: Ronald A. Ferrante, Ridgecrest, Calif.

[73] Assignee: The United States of America as represented by the Secretary of the Navy, Washington, D.C.

[21] Appl. No.: 156,157

[22] Filed: Jun. 3, 1980

[51] Int. Cl.$^3$ .......................... G03H 1/20; G02B 5/32
[52] U.S. Cl. .................................. 350/3.70; 350/3.73; 350/3.69
[58] Field of Search ................. 350/3.70, 3.72, 3.73, 350/3.69

[56] References Cited

U.S. PATENT DOCUMENTS

| | | | |
|---|---|---|---|
| 3,501,216 | 3/1970 | Kogelnik | 350/3.5 |
| 3,506,327 | 4/1970 | Leith et al. | 350/3.5 |
| 3,598,466 | 8/1971 | Friedl | 350/3.5 |
| 3,651,326 | 3/1972 | Alpers | 250/203 CT |
| 3,725,576 | 4/1973 | Crawford et al. | 178/6.8 |
| 3,729,152 | 4/1973 | Stephenson | 244/3.16 |
| 3,743,376 | 7/1973 | Russell | 350/3.5 |
| 3,772,516 | 11/1973 | Roberts et al. | 250/201 |
| 3,885,856 | 5/1975 | Ostrowsky et al. | 350/3.5 |
| 3,901,578 | 8/1975 | Hudson | 350/3.5 |
| 3,905,019 | 9/1975 | Aoki et al. | 340/146.3 |
| 3,905,676 | 9/1975 | Ulrich | 350/96 |
| 3,907,402 | 9/1975 | Freisem | 350/3.5 |
| 3,915,548 | 10/1975 | Opittek et al. | 350/3.5 |
| 4,054,356 | 10/1977 | Noguchi | 350/3.5 |
| 4,057,319 | 11/1977 | Ash et al. | 350/96 C |

OTHER PUBLICATIONS

McCauley, Donald G., Published Patent Application S. N. 800752, filed 5/26/77, available from NTIS, indexed in "Govn. Reports-Announcements & Index", vol. 1977, Issue 24, Nov. 1977.

Chen et al, "Holographically Improved Windows", DTIC Technical Report-AD-A067914, Mar. 1979, (pp. 1, 52, 56).

*Primary Examiner*—Ronald J. Stern
*Attorney, Agent, or Firm*—Robert F. Beers; W. Thom Skeer; Kenneth G. Pritchard

[57] ABSTRACT

One or more holographic optical elements are placed within an aerodynamic front enclosure. Each element redirects a transmitted electro-magnetic wave to a radiation detector. The holographic optical elements correct by diffraction the aberration in a wavefront caused by transmission through the aerodynamic frontal enclosure. Each holographic optical element corrects for wavefronts coming from different directions.

1 Claim, 4 Drawing Figures ial focusing systems. In
HOLOGRAPHIC CORRECTOR ELEMENT

BACKGROUND OF THE INVENTION

1. Field of the Invention

This invention relates to optical focusing systems. In particular it relates to holographic optical focusing systems and in even further particularity relates to focusing systems for aerodynamic enclosures such as nose cones of planes, missiles, bombs and so forth.

2. Description of the Prior Art

The use of aerodynamically superior dome shapes in optical missile seekers significantly reduces drag. This results in increased effective range and closing speeds while also reducing rain erosion rates for improved all-weather performance.

For an optical seeker to function properly, the optical effects produced by the dome must be independent of the angle of incidence of the incoming target radiation. This requirement has in the past dictated the use of a hemispherical rather than a more aerodynamic suitable dome shape such as an ogive. The aberrations introduced by aerodynamic frontal enclosure designs cannot be corrected by conventional refractive or reflective optics.

Previous optical focusing systems for aerodynamic structures have required use of conventional lenses and mirrors for optical systems. Lenses have required traditional optical grinding to avoid aberrations and other distortions that destroy the focusing of the image. Use of conventional optics requires the frontal structure to be designed for optimum guidance abilities rather than optimum flight performance of the vehicle. Flight parameters effected by conventional optics are increased resistance to flight weather, decreased closing speed, decreased flight range, less manuveability, decreased guidance stability, manufacturing simplicity, increased miss distance, and multimode operations. All of these factors have been limited because of loss of guidance capabilities.

SUMMARY OF THE INVENTION

Holographic optical elements reshape radiation wavefronts primarily by the mechanism of diffraction, as opposed to refraction and reflection of conventional lenses and mirrors. Unlike lenses and mirrors, whose geometrical shape is critical to performance, holographic optical elements in this invention are quite thin. They may be fabricated to reshape wavefronts as required while being of nearly arbitrary shape themselves. Since the optical properties of a hologram are independent of the element's shape to first order, the element is recorded as a thin film layer lining the inner surface of the frontal enclosure. This thin film hologram will be a phase only hologram which is basically transparent to radiation from other than the desired direction.

The use of superior aerodynamic frontal enclosures provides a higher level of performance with all other parameters of the flight structure remaining the same. By placing holographic elements within the frontal enclosure, the physical geometric shape of the frontal enclosure is no longer restricted by the optical systems used for guidance. The frontal enclosure can be designed among any of the forms known in the art which produce superior aerodynamic performance, such as an ogive shaped cone. These forms produce severe aberrations of plane waves. The aberrated waves then pass through holographic optical elements which act as diffraction patterns for reconstructing the plane waves.

These holographic materials can be produced according to a disclosed method. The method uses a holographic construction of the aberrated wave with a reference wave to produce a first hologram. This hologram is then illuminated with conjugate radiation to emit the conjugate to the aberrated wave. This wave is focused on a second layer of holographic material which is shaped in the desired configuration to fit a portion of the aerodynamic enclosure. This layer is further illuminated by the conjugate of the target radiation. The combined effect in the second layer is to produce a hologram which when illuminated by the aberrated wavefront emits a plane wave or other desired wavefront according to the reference wave used. Different portions of the frontal enclosure are lined with holograms that correct aberrations from different directions of incoming light.

An object of the current invention is to provide an apparatus which permits aerodynamic frontal enclosures to be based on superior flight characteristics.

A further object of this invention is to provide a method of producing holographic optical elements so that the desired frontal enclosures are possible.

DESCRIPTION OF THE PREFERRED EMBODIMENTS

Figure 1:
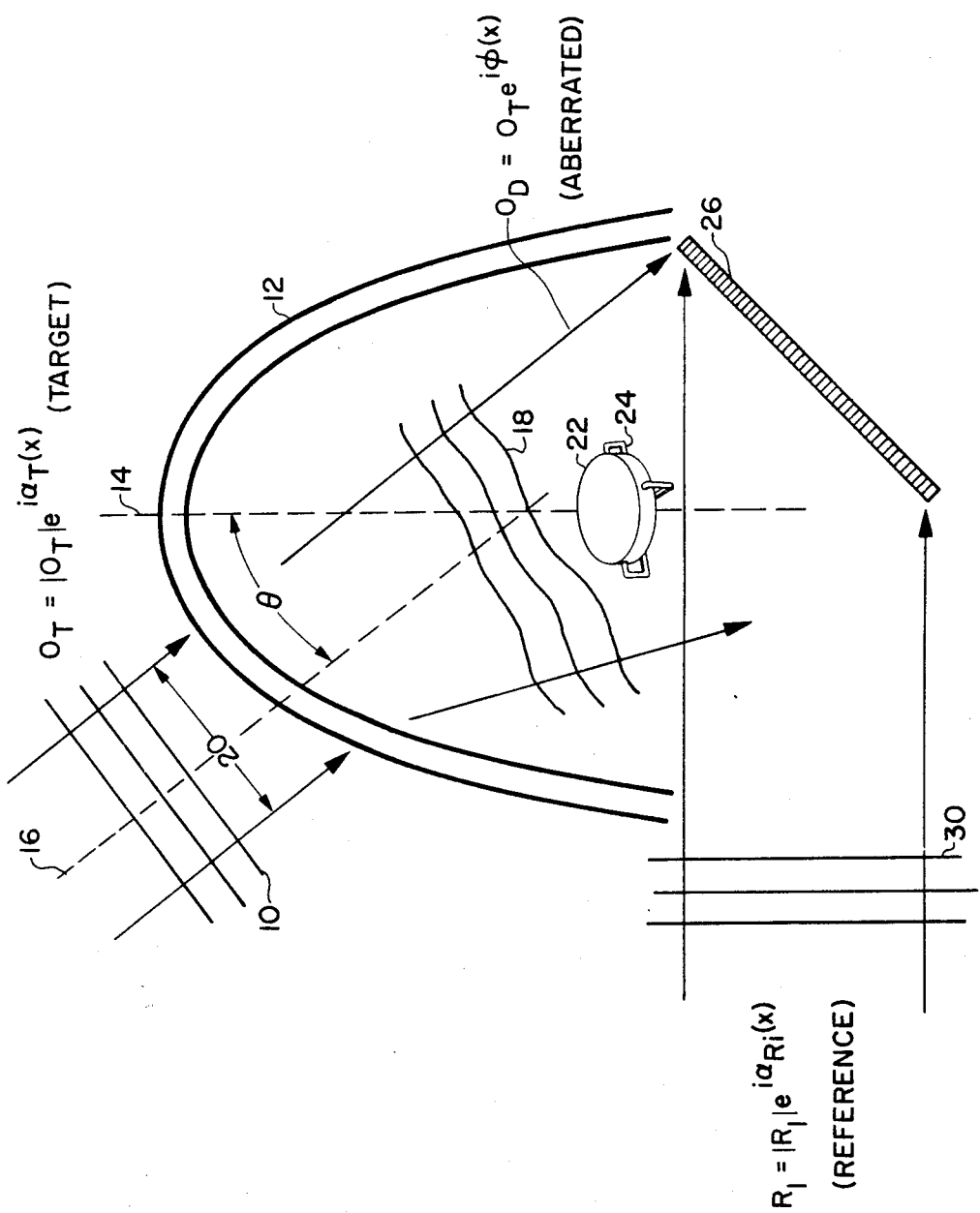
FIG. 1 is a cross-section of an aerodynamic frontal enclosure with an incident wavefront upon it.

FIG. 1 is a typical cross-sectional view of a missile, bomb, or other aerodymanic frontal enclosure. An incident wavefront 10 of target radiation is incident on the frontal enclosure 12. The orientation in space of the incident wavefront 10 to the axis of symmetry 14 of enclosure 12 is defined by the angle $\theta$ measured between the normal 16 of wavefront 10 and axis 14. Since $\theta$ defines a cone about axis 14, a polar coordinate $\alpha$ is also needed to uniquely specify the direction of a normal 16, $\alpha$ can be measured from any arbitrary point on the circumference of enclosure 12. Wavefront 10 is refracted by the outer surface of frontal enclosure 12 and transmitted as aberrated wavefront 18. Changing angle $\theta$ changes aberrated wavefront 18 even if wavefront 18 is transmitted through the same portion 20 of enclosure 12 as shown on FIG. 1. Placing a detector in the path of aberrated wavefront 18 can result in useful information being lost because of blind spots in aberrated wavefront 18. Target radiation can only be observed if wavefront 18 is as well defined as incoming wavefront 10.

Wavefront 10 is transmitted through enclosure 12 with varying degrees of aberration. The section of enclosure 12 with matching $\theta$ and $\alpha$ coordinates will have the predominate cross-section and cause the least aberration. Placing a detector 22 within enclosure 12 permits a search to identify incoming $\theta$ and $\alpha$ of wavefront 10. Detector 22, such as a silicon photodetector, has complete freedom to search if it is mounted on a gimbal support 24. Detector 22 will only see wavefront 18 that is transmitted through the $\theta$ and $\alpha$ matching section of enclosure 12. The rest of wavefront 10 transmitted through other sections of enclosure 12 will be aberrated so much that it will not be observed by detector 22. In prior art systems, hemispherical frontal enclosures offered the same aberration in all directions. For the ogive shape in FIG. 1, the degree of aberration is different for each conic cross-section.

FIG. 1 is a cross-section of a portion of the dome and a holographic element 26. Shown is the path of aberrated wavefront 18 through this optical system. Holographic element 26 is illuminated with a reference wave 30. This permits a hologram of aberrated wavefront 18 to be made.

This invention makes use of the unique properties of diffractive optics. Correction of dome induced aberrations is performed by a holographic optical element, HOE, 40, shown in FIG. 2 and FIG. 3. Since the optical properties of a hologram are independent of the element's shape, to first order the corrector or HOE 40 can be recorded as a thin film layer lining the inner surface of the dome.

Figure 2:
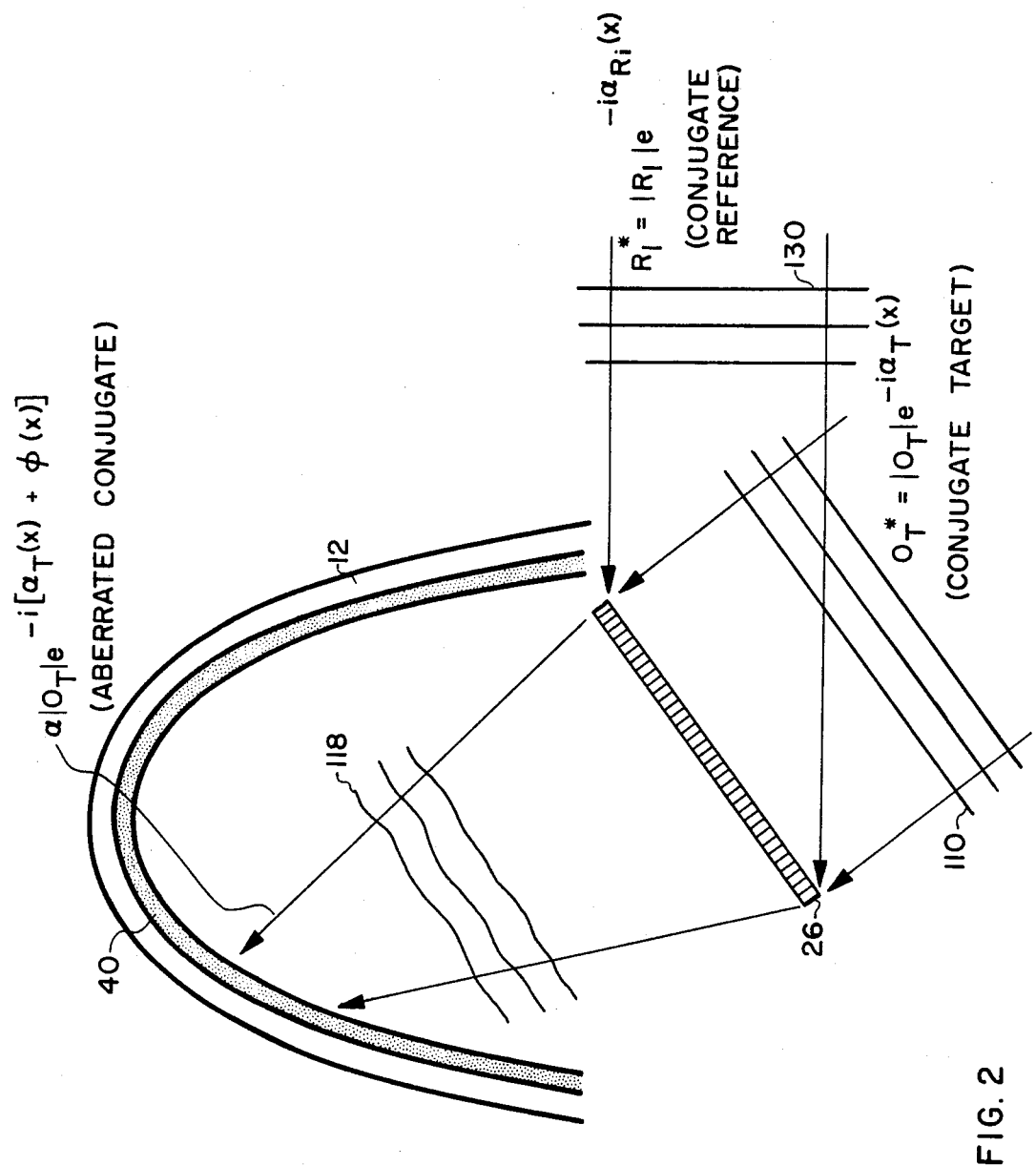
FIG. 2 shows the placing of a holographic optical element within the frontal enclosure.
Figure 3:
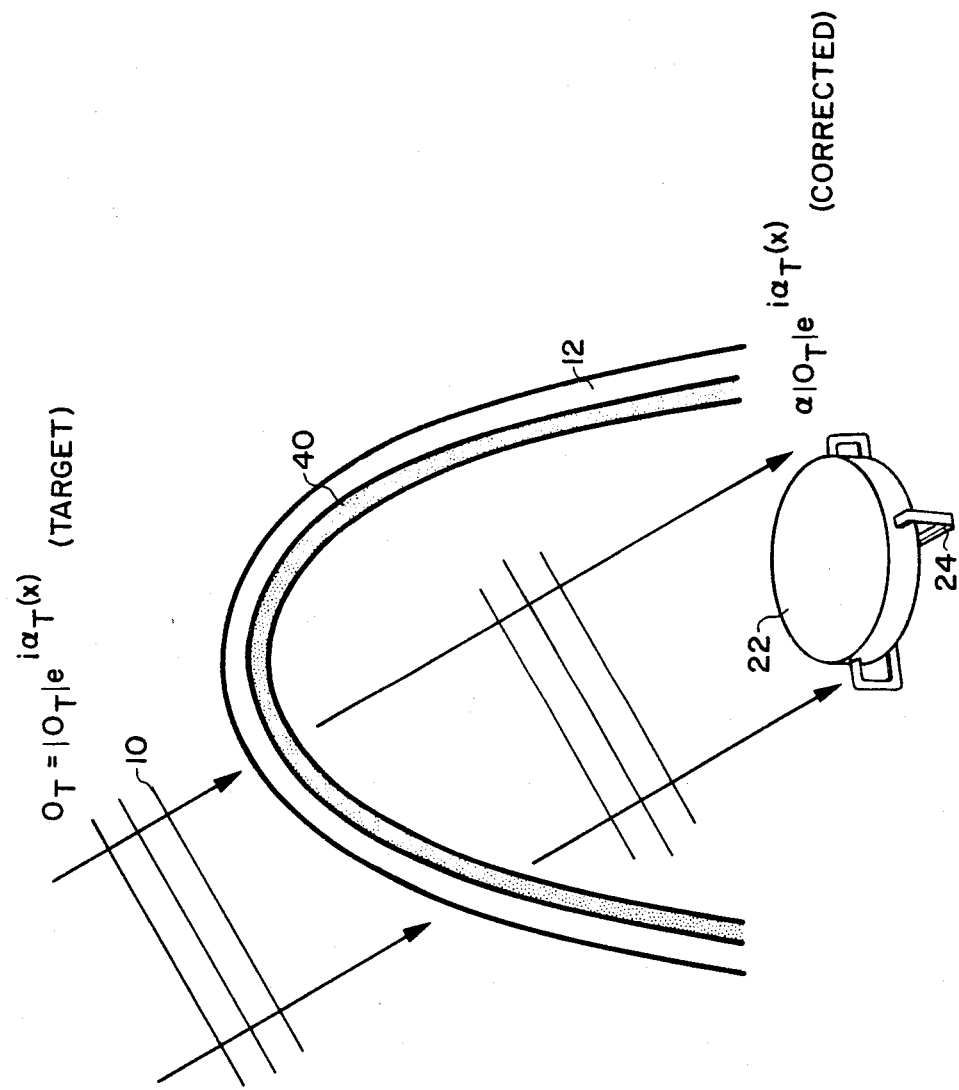
FIG. 3 shows the effect of the present invention on a frontal enclosure.

Steps in producing the holographic corrector by means of a conjugate wave technique are shown in FIGS. 1–3.

In FIG. 1 coherent laser radiation, wavefront 10, can be expressed as:

$$O_T = |O_T| e^{i\alpha T(x)} \tag{1}$$

simulating a target incident on the aerodynamically superior dome, frontal enclosure 12. Aberrations introduced by the dome result in phase errors $\phi(x)$ in the transmitted wavefront, such that $$O_D = O_T e^{i\phi(x)} = |O_T| e^{i[\alpha T(x)+\phi(x)]} \tag{2}$$

aberrated wavefront 18 is passed by the dome. If aberrated wavefront 18 is made to interfere with an unaberrated coherent plane wave reference, $$R_1 = |R_1| e^{i\alpha R_1(x)} \tag{3}$$

within the volume of a holographic recording material, the resulting exposure of the photosensitive material is $$E_1(x) = |O_D + R_1| = (O_D + R_1)(O_D + R_1)^* \tag{4}$$

where (*) denotes the complex conjugate. Substituting for $O_D$ and $R_1$ yields $$E_1(x) = |O_T|^2 + |R_1|^2 + |O_T||R_1|\{e^{i[\alpha T(x)+\phi(x)-\alpha R_1(x)]} + e^{-i[\alpha T(x)+\phi(x)-\alpha R_1(x)]}\} \tag{5}$$

Assume the holographic recording material, hologram 26, is an absorption medium, such as a silver halide emulsion, exposed in the linear recording region such that the amplitude transmittance of the exposed and processed hologram is $$T_1 = T_{01} + \beta_1 E_1(x) \tag{6}$$

where $T_{01}$ and $\beta_1$ are material constants. Substituting (5) into (6) gives $$T_1 = T_{01} + \beta_1 |O_T|^2 + \beta_1 |O_T||R_1| e^{i[\alpha T(x)+\phi(x)-\alpha R_1(x)]} + \beta_1 |R_1||O_T| e^{-i[\alpha T(x)+\phi(x)-\alpha R_1(x)]} + \beta_1 |R_1|^2 \tag{7}$$

If the hologram is re-illuminated by the conjugate, FIG. 2, $$R_1^* = |R_1| e^{-i\alpha R_1(x)} \tag{8}$$

the wavefronts reconstructed by the hologram will be $$T_1 R_1^* = T_{01} |R_1| e^{-i\alpha R_1(x)} + \beta_1 |O_T|^2 |R_1| e^{-i\alpha R_1(x)} + \beta_1 |R_1|^3 e^{-i\alpha R_1(x)} + \beta_1 |O_T||R_1|^2 e^{i[\alpha T(x)+\phi(x)-2\alpha R_1(x)]} + \beta_1 |R_1|^2 |O_T| e^{-i[\alpha T(x)+\phi(x)]} \tag{9}$$

The first three terms on the right side of equation (9) are 0-order in the direction of the conjugate reference and not incident on enclosure 12. The fourth term is −1-order, on the other side of the 0-order and is also not incident on enclosure 12. The last term $$\beta_1 |O_T||R_1|^2 e^{-i[\alpha T(x)+\phi(x)]} \tag{10}$$

is anti-parallel to $O_D$ and is incident on the dome's interior surface, the same surface section that transmitted the original "target" radiation, wavefront 10.

Suppose now an unaberrated target conjugate $$O_T^* = |O_T| e^{-i\alpha T(x)} \tag{11}$$

is passed through recorded hologram 26 as shown in FIG. 2. Hologram reconstructions are given by $$T_1 O_T^* = \beta_1 |O_T|^2 |R_1| e^{i[\phi(x)-\alpha R_1(x)]} + \beta_1 |O_T|^2 |R_1| e^{-i[2\alpha T(x)+\phi(x)-2\alpha R_1(x)]} + T_{01} |O_T| e^{-i\alpha T(x)} + \beta_1$$

$|O_T|^3 e^{-i\alpha T(x)}$ $+\beta_1 |O_T|$ $||R_1|^2 e^{-i\alpha T(x)}$  (12)

The first term on the right side of (12) is in the direction of the conjugate reference wave $R_1^*$ and is therefore not incident on the dome. The second term is also not in the $O_T^*$ direction and will miss the dome section of interest. The last three terms of (12) are all in the conjugate target wave (11) direction. Since $T_{01}$, $\beta_1$, $|O_T|$ and $|R_1|$ are constants, this implies an unaberrated portion of the incident wavefront is transmitted by the hologram with only a constant amplitude change or $T_{01}|O_T|e^{-\alpha T(x)} + \beta_1 |O_T|$ $|^3 e^{-i\alpha T(x)}$ $+\beta_1 |O_T|$ $||R_1|^2 e^{-i\alpha T(x)} = K|O_T|$ $|e^{-i\alpha T(x)} = KO_T^*$  (13)

where K = constant. Other than a constant amplitude modulation, equation (11) is unaffected by the presence of hologram 26.

At the inner dome surface, then, the exposure from (13) and (10) is given by $E_2(x) = |$ $K|O_T|e^{-i\alpha T(x)}$ $+\beta_1 |O_T|$ $||R_1|^2 e^{-i}$ $[\alpha T(x)+\phi(x)]|$  (14)

or $E_2(x) = |KO_T^*$ $+K'O_D^*| = (KO_T^* + K'O_D^*)$ $(KO_T + K'O_D)$  (15)

where $K' = \beta_1 |R_1|^2$. Multiplying out (15) yields $E_2(x) = K^2 |O_T|$ $|^2 + K'^2 |O_T|^2 + KK'O^*_T$ $O_D + KK'O_T O_D^*$  (16)

To optimize the performance of holographic corrector 40, the element should be produced in a phase holographic recording material. Materials such as dichromated gelatin and photosensitized thermoplastics have a theoretical maximum diffraction efficiency of 100% and have achieved very high efficiencies (>90%) in the laboratory. Both of these materials are well known in the art. This method is limited to producing holograms for a specific frequency of incoming light.

Assume such a phase material is exposed in the "linear" region such that the phase modulation is given by $\theta(x) = \gamma E_2(x)$  (17)

where $\gamma$ = a constant. The holographic corrector element transmittance is then $T_2 = T_{02} e^{i\theta(x)}$ $= e^{i\gamma E_2(x)}$  (18)

where $T_{02}$ = a constant of the material close to 1.0. Substituting (16) into (18) gives $T_2 = T_{02} e^{i\gamma K^2 |O_T|^2} e^{i\gamma K'^2 |O_T|^2}$ $e^{i\gamma KK'O^*TO}$ $De^{i\gamma KK'O_T O^*_D}$  (19)

A Taylor series expansion of (19) yields $T_2 = T_{02}\{[1+i\gamma K^2 |O_T|^2 + \ldots]$ $[1+i\gamma K'^2 |O_T|^2 + \ldots]$ $[1+i\gamma KK'O^*_T O_D + \ldots]$ $[1+i\gamma KK'O_T O^*_D + \ldots]\}$  (20)

Since K, K', $\gamma$ and $|O_T|$ are constants, these terms can be incorporated into $T_{02}$ such that $T_{02}' = T_{02}[1+i\gamma K^2 |O_T|^2$ $+\ldots][1+i\gamma K'^2 |O_T|^2 + \ldots]$  (21)

Substituting (21) into (20) and multiplying out gives $T_2 \doteq T'_{02}\{1 + i\gamma KK'[O^*_T O_D +$  (22)

$O_T O^*_D] - \gamma^2 K^2 K'^2 |O_T|^2 |O_D|^2 - \frac{\gamma^2 KK'}{2}[O^2_T O^{*2}_D + O^{*2}_T O^2_D]\}$ where terms of $\gamma^3$ or higher have been neglected. The term $-\gamma^2 K^2 K'^2 |O_T|^2 |O_D|^2$ is a constant which can be included in $T_2$ as $T_2 = T_2 - T_{02}\gamma^2 K^2 K'^2 |O_T|^2 |O_D|^2$  (23)

The last terms on the right side of equation (22) represent noise terms. However, since their directions on reconstruction are not the same as the O-order, primary or conjugate images they represent can be neglected. Equation (23) becomes then $T_2 \doteq T_{02}\{1+i\gamma KK'[O^*_T O_D + O_T O^*_D]\}$  (24)

as the recorded transmission of holographic corrector 40 in the direction of the dome. If the dome is now illuminated with the original target radiation, FIG. 3, aberrated wavefront 18 passed by the dome $O_D = O_T e^{i\phi(x)} = |O_T| e^{i[\alpha T(x)+\phi(x)]}$  (2)

is incident on corrector hologram 40. Its transmission is then given by $T_2'O_D = T_{02}\{O_D + i\gamma KK'[O_T^* O_D^2 + O_T]\}$  (25)

or $T_2'O_D = T_{02}\{O_D + i\gamma KK'[O_T^* O_D^2 + O_T]\}$  (26)

The first term to the right of (26) is 0-order feedthrough, while the second term represents a highly aberrated first order reconstruction. The last term in the expression is the term of interest. It predicts that holographic corrector element 40 will reconstruct a wavefront whose irradiance is proportional to that of the original target wave $O_T$ such that $$\text{Corrected Wave} = I_c = (i\gamma T'_{02}KK'O_T)(i\gamma T'_{02}KK'O_T)^* \quad (27)$$

where $$I_T = O_T O_T^* = \text{irradiance of the original target wavefront}. \quad (28)$$

Again, since $T'_{02}, K, K'$ and $O_T$ are constants this reduces to $$I_C = CO_T O_T^* = CI_T \quad (29)$$

where C = a constant. Aberrations introduced by transmission through the aerodynamically superior dome have been corrected.

The effects of the aberrated wavefronts represented by the first two terms in equation (26) can be minimized by producing a high efficiency phase hologram, such that a very large percentage of the incident illumination is diffracted into the desired order (C→1).

The dome cross-section in FIGS. 1–3 is out of scale. Hologram corrector element 40 is tens of micrometers thick and enclosure 12 is thousands of micrometers thick. There is an optimum angle $\theta$ and angle $\alpha$ for a particular section of enclosure 12 which permits variations around $\theta$ and $\alpha$ to minimize the aberrations seen by detector 22.

Figure 4:
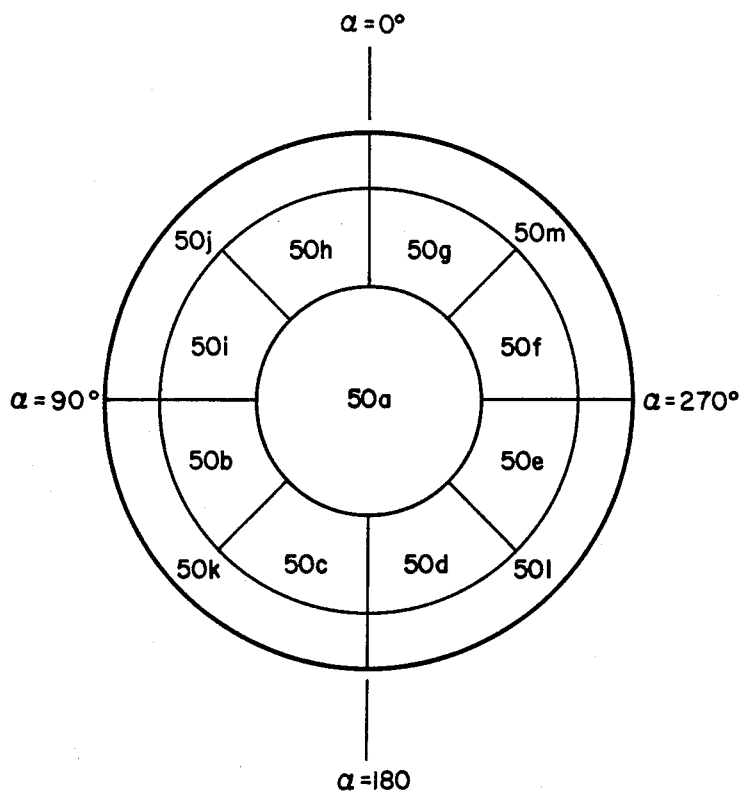
FIG. 4 is a top view of a segmented frontal enclosure.

Hologram corrector element 40 fits inside of the dome like a lining. This lining can be segmented to permit different sections of it to correct for different combinations of $\theta$ and $\alpha$. FIG. 4 shows a possible segment arrangement of sectors in concentric rings. Larger segments, in FIG. 4, permit weaker signals to be detected. This advantage is offset by the increased amount of aberration that has to be tolerated when the target is not near the $\theta - \alpha$ combination which one of the thirteen segments, 50a–50m, are centered on. Once segment 50a is exposed, the dome can be rotated to illuminate 50b and so on, due to the circular symmetry of the dome. Possible $\theta$ values of segments 50a, 50c, and 50k are 10°, 20° and 25°. The smaller the value of $\theta$, the better the resolution but the smaller the search area.

Thus, each section has a unique coordinate pair, ($\theta$, $\alpha$), that defines the direction of incoming light waves that the section will reshape. The only section where such a coordinate pair is not appropriate is when the angle from the axis is zero, $\theta = 0$, where $\alpha$ can be considered to have no or all values.

Construction of a phase-only hologram as a dome lining permits detector 22 to selectively scan each segment without recording spurious signals from adjoining segments. For incident radiation beyond narrow ranges of $\theta$ and $\alpha$, hologram corrector element 40 is transparent. However, these segments do give rise to aberrations which further dilute and scatter the transmitted light to levels well beneath detection levels.

The two step hologram formation step disclosed here avoids aberration problems during creation of the liner.

It is obvious to those skilled in the arts that numerous variations of the above can be made.

What is claimed is:

1. In an aerodynamic frontal enclosure with an ogive shape that transmits light the improvement comprising:

a shell of holographic material divided into a plurality of sections placed within said ogive shaped frontal enclosure such that it forms a lining to said ogive shaped frontal enclosure for reshaping light transmitted through said frontal enclosure from a field-of-view limited to a direction unique to each section, said plurality of sections having one section centered at the top of said ogive shaped frontal enclosure and the remaining sections arranged to form sectors in at least one concentric ring about said centered section;

a detector within said liner shell of holographic material for measuring said reshaped transmitted light; and a gimballed support attached to said detector for pointing the detector at each section, such that said detector determines whether predetermined reshaped light has been transmitted by any of said sections.

* * * * *